Patented July 2, 1946

2,403,207

UNITED STATES PATENT OFFICE 2,403,207

CHEMICAL PROCESS AND PRODUCTS

Paul L. Barrick, Wilmington, Del., assignor to E. I. du Pont de Nemours & Company, Wilmington, Del., a corporation of Delaware No Drawing. Application March 8, 1943, Serial No. 478,417

17 Claims. (Cl. 260—513)

This invention relates to the preparation of fluorinated organic compounds and to new organic fluorine compounds. More particularly, the invention comprises a new process for the preparation of polyfluoro organic acids and includes new chemical products consisting of polyfluoro organic compounds containing a sulfonyl group.

It has previously been proposed to produce organic fluorine compounds by the reaction of fluorine with various organic materials. Prior investigations have shown that this reaction of fluorine results in vigorous or explosive reactions, accompanied by charring. Accordingly, the direct action of fluorine on organic materials has not been useful as a means for preparing organic fluorides.

Heretofore, the usual method for preparing organic fluorine compounds consisted in reacting halogenated organic compounds with hydrogen fluoride or with metallic fluorides. However, such processes yield a mixture of products, involve considerable expense, and their application is restricted to certain types of halogenated compounds.

It is an object of this invention to provide a new process for the preparation of polyfluoro organic acids without using dangerous or expensive inorganic reagents. Another object of this invention is to obtain new compositions of matter consisting of organic fluorine compounds containing a sulfonyl group. Still another object is to provide a new process for readily preparing difluoroacetic acid, its salts and derivatives. A further object is to provide a process for preparing polyfluoroethanesulfonic acids, their salts and derivatives. A still further object is to obtain new compounds consisting of polyfluoroethanesulfonic acids, their salts and derivatives which possess many novel and useful properties. Other objects will appear hereinafter.

These objects are accomplished by reacting a polyfluoroethylene containing at least two fluorine atoms, two of which are attached to one carbon atom, with a sulfurous acid salt. This reaction produces polyfluoroethanesulfonic acid salts which may be converted to the corresponding acids and their derivatives. By employing a polyfluoroethylene such as tetrafluoroethylene, there is also obtained difluoroacetic acid salts which may be converted to the corresponding acid and its derivatives.

A preferred form of the invention may be carried out by reacting tetrafluoroethylene with an aqueous solution of a sulfurous acid salt. A mixture is obtained containing tetrafluoroethanesulfonic acid salts and difluoroacetic acid salts. These fluorinated organic salts are readily separated from the inorganic salts by evaporating the reaction mixture to dryness and extracting with alcohol.

Sulfurous acid salts, as used herein, designate an inorganic water-soluble sulfurous acid salt containing a metal or inorganic radical which will yield a water-soluble salt. The alkali metal sulfurous acid salts are preferred for use in this invention. However, the invention is applicable generally to inorganic water-soluble sulfurous acid salts and to water-soluble alkali and alkaline earth sulfites and bisulfites.

The polyfluoroethylenes suitable for use in this invention may be represented by the general formula $CX_2=CX_2$, where two X's attached to one of the carbon atoms are fluorine and the other two X's are selected from the group consisting of hydrogen and halogen. It is preferable to use polyfluoroethylenes containing at least three halogen atoms, of which at least two are fluorine. Thus in the general formula one X would be selected from the group consisting of hydrogen and halogen and the other three X's would be halogen, of which at least two attached to one carbon atom would be fluorine. Tetrahaloethylenes containing at least three fluorine atoms are the most preferred group of polyfluoroethylenes.

The polyfluoroethanesulfonyl compounds obtained by the present invention may be represented by the general formula $$[H(CX_2CX_2)-SO_2O]_nM$$

where two X's attached to one carbon atom are fluorine, the other two X's are selected from the group consisting of hydrogen and halogen, M is a member selected from the group consisting of hydrogen, metals and inorganic radicals which will yield inorganic water-soluble sulfurous acid salts, and $n$ is a positive integer equal to the valence of M. Thus the polyfluoroethanesulfonic acids of this invention may be represented by the general formula $H(CX_2CX_2)-SO_2OH$ where two X's attached to one carbon atom are fluorine and the other two X's are selected from the group consisting of hydrogen and halogen. It is understood that the unit in parenthesis represents the particular polyfluoroethylene employed. With the unsymmetrical polyfluoroethylenes, it is possible that two isomeric products may be obtained. However, with tetrafluoroethylene only one salt would be obtained represented by the formulae $$[H(CF_2CF_2)SO_3]_nM$$

the acid being represented by the formula $$HCF_2CF_2SO_2OH$$

The polyfluoroethanesulfonates, such as the sodium salts, or the sulfonic acids may be converted into the corresponding sulfonyl chlorides by reaction with phosphorus chlorides, such as phosphorus pentachloride. Thus, using the salts or the acid obtained from sulfurous acid salts and tetrafluoroethylene there is produced tetrafluoroethanesulfonyl chloride [$HCF_2CF_2SO_2Cl$]. The sulfonyl chlorides can be readily converted into sulfonamides by reaction with ammonia or primary or secondary amines.

The most general formula representing the new polyfluorosulfonyl products of this invention is $H(CX_2CX_2)Z$ where two X's attached to one of the carobn atoms are fluorine, the other two X's are selected from the group consisting of hydrogen and halogen, and Z is a monovalent radical containing a sulfonyl group of which the sulfur atom is directly connected to carbon of the ($CX_2CX_2$) group.

The method for carrying out the reaction varies to some extent with different polyfluoroethylenes and sulfurous acid salts, but the usual procedure comprises charging water and the sulfurous acid salt into a high pressure reaction vessel, adding a given amount of polyfluoroethylene, such as tetrafluoroethylene, and then closing the reaction vessel and heating to the desired temperature while mechanically agitating the reaction vessel for several hours. The fluorinated organic salts are separated from the inorganic salts by evaporating the reaction mixture to dryness, extracting with alcohol, and then evaporating off the alcohol. Although the sulfonic acid salt can be partially separated from the difluoroacetic acid salt by fractional crystallization, it is preferable to convert the salts into the corresponding acids and to separate the acids by fractional distillation.

The temperature at which the reaction is effected may be varied over a wide range depending largely upon the nature of the reactants, the results desired, and the other conditions of the reaction. However, the temperature should be below that at which decomposition or pyrolysis of either the reactants or products occur. No appreciable reaction is obtained below 0° C. and it is usually necessary to heat the reaction mixture to 35° C. or higher in order to obtain a substantial reaction in a reasonable time. It is usually desirable to carry out the reaction at an elevated temperature and the preferred temperature range is 50–200° C., but higher temperatures are sometimes desirable especially for preparing difluoroacetic acid salts.

Catalysts such as oxygen and peroxygen compounds may be used in the process of this invention although such catalysts are not necessary. It is often advantageous to add various inorganic salts such as borax or disodium phosphate which exert a buffering action and help keep the reaction mixture from becoming strongly acidic which has a tendency to stop the reaction. In general, it is desirable to have the pH of the aqueous solution above 3.5 at room temperature and the preferred pH range for preparing the polyfluoroethanesulfonate salts is 4.5 to 10.5. The yield of the difluoroacetic acid salts increases with increase in pH and if one wishes to prepare difluoroacetic acid salt in appreciable amounts a pH above 8 is desirable. It is understood that other halogen-substituted acetic acid salts may be obtained by using polyfluoroethylenes other than tetrafluoroethylene. Thus, when trifluorochloroethylene is used, difluoroacetic acid salt, fluorochloroacetic acid salt or a mixture of the two salts may be obtained. Similarly, difluoroacetic acid salt, monofluoroacetic acid salt or mixtures thereof may be obtained when trifluoroethylene is used.

The proportion of water in the reaction mixture may vary within relatively wide limits depending largely upon the nature of the reactants and products. Efficient reaction may be effected using dilute or saturated aqueous solutions of the sulfurous acid salts. Since the sulfonic acid salts formed are usually much more soluble than the original inorganic sulfurous acid salts, an excess of the solid sulfurous acid salt over a saturated solution may be placed in the bottom of the reactor and as the reaction proceeds more and more will dissolve in the water. Thus, it is possible to carry out reactions with sulfurous acid salts which are only slightly soluble in water in convenient sized equipment.

The invention is further illustrated by the following examples in which the parts are by weight unless otherwise specified.

Example I

A mixture of 100 parts of sodium sulfite and 200 parts of water was charged into a silver-lined autoclave and after evacuating the system, the autoclave was pressured with tetrafluoroethylene to 350 lbs./sq. in. at 120° C. and repressured to 350 lbs./sq. in. with tetrafluoroethylene when the pressure dropped to about 325 lbs./sq. in. during the run. The reaction proceeded smoothly and over a period of 9 hours at 120° C. there was a total pressure drop of about 1270 lbs./sq. in. The reaction mixture had a pH of 10.2 and was filtered to remove a small amount of coarse nonfusible solid (11.4 parts) which corresponded to sodium fluoride in composition. The filtrate was evaporated to dryness and the solid residue treated with hot absolute ethanol and filtered to remove the alcohol-insoluble inorganic salts such as sodium sulfite and sodium fluoride. The colorless salt obtained by evaporating off the alcohol amounted to 177 parts and was found to consist of a mixture of sodium tetrafluoroethanesulfonate and sodium difluoroacetate melting at about 160° C. Although the salts can be separated by fractional crystallization from various solvents, it was found more convenient to convert the salts into the corresponding acids and to separate the acids by fractional distillation. About 439 parts of the alcohol-soluble sodium tetrafluoroethanesulfonate and difluoroacetate salts obtained as described in this example without removing the last traces of alcohol were treated with about 500 parts of 35% sulfuric acid and filtered to remove the solid precipitate of sodium sulfate. The filtrate was extracted several times with ether and the ether extracts combined and rectified. Considerable water and low boiling material were obtained which consisted of about 10 parts ethyl difluoroacetate boiling at 96–100° C. and 15 parts of difluoroacetic acid boiling at 132–133.5° C. However, the main product boiling at 110° C./3 mm. was tetrafluoroethanesulfonic acid – monohydrate and amounted to about 248 parts. The sulfonic acid-monohydrate was solid at room temperature, melted at about 54° C. and was extremely hydroscopic.

| | F | S | Neutral equivalent |
|---|---|---|---|
| | Percent | Percent | |
| Analysis | 37.90 | 16.10 | 198.8 |
| Calc. for $HCF_2CF_2SO_3H.H_2O$ | 38.00 | 16.0 | 200 |

A mixture of 96 parts of tetrafluoroethanesulfonic acid-monohydrate described above and 130 parts of thionyl chloride were warmed gently for about an hour and the mixture rectified. After removing the unreacted thionyl chloride, 81 parts of the anhydrous tetrafluoroethanesulfonic acid boiling at about 59.5° C./1 mm. were obtained.

Neutral equivalent 182.9; 183.4; S=17.76%. Calc. for $HCF_2CF_2SO_3H$: N. E. 182; S=17.6%.

Tetrafluoroethanesulfonic acid is a strong acid and chars filter paper. The anhydrous acid is a liquid, very soluble in water.

Eighty-one parts of tetrafluoroethanesulfonic acid was slowly added to 100 parts of phosphorus pentachloride. Careful rectification through a packed column was necessary in order to separate the tetrafluoroethanesulfonyl chloride boiling at about 90–92° C. from the phosphorus oxychloride.

|  | F | Cl | S |
|---|---|---|---|
|  | Percent | Percent | Percent |
| Analysis of fraction boiling at 90–92° C | 36.25 | 17.55 | 14.87 |
| Calc. for $HCF_2CF_2SO_2Cl$ | 37.9 | 17.73 | 15.95 |

Example II

A mixture of 20 parts of sodium bisulfite, 200 parts of water, 50 parts of borax and 1 part of benzoyl peroxide, having a pH of about 7 was charged into a silver-lined autoclave and after pressuring with tetrafluoroethylene to 150 lbs./sq. in. the reaction mixture was heated at 120° C. with agitation for eight hours. The system was repressured with tetrafluoroethylene to 150 lbs./sq. in. when the pressure dropped to about 125 lbs./sq. in. during the run. The reaction proceeded smoothly and a total pressure drop of about 355 lbs./sq. in. was obtained. On working up the reaction mixture as described in Example I, 28 parts of alcohol-soluble salts were obtained melting at about 295° C. which consisted principally of sodium tetrafluoroethanesulfonate (F, 35.75%; S, 14.98%; Na, 11.81%).

Example III

A mixture of 100 parts of potassium sulfite, 150 parts of water, and 1.5 parts of benzoyl peroxide were charged into an autoclave and the system evacuated and pressured with tetrafluoroethylene to 350 lbs./sq. in. at 120° C. as described in Example I. A total pressure drop of about 1180 lbs./sq. in. was observed and 186 parts of alcohol-soluble products consisting of potassium tetrafluoroethanesulfonate and potassium difluoroacetate were obtained.

The reaction products were worked up as described under Example I and yielded similar products.

Ten parts of tetrafluoroethanesulfonic acid was reacted with an excess of solid sodium carbonate. The reaction mixture was treated with absolute ethyl alcohol and filtered to remove the unreacted sodium carbonate. Evaporation of the alcohol yielded a colorless solid which melted at about 294° C. when heated on a copper block in the air. After drying for some time at about 105° C., the sodium tetrafluoroethanesulfonate was analyzed.

|  | F | S | Na |
|---|---|---|---|
|  | Percent | Percent | Percent |
| Found | 37.4 | 15.71 | 11.34 |
| Calc. for $C_2HF_4SO_3Na$ | 37.3 | 15.7 | 11.27 |

Eight parts of tetrafluoroethanesulfonic acid was added slowly to an excess of aniline. A vigorous reaction occurred and a solid separated. The excess of aniline was filtered off and the solid product washed thoroughly with ether. The solid was readily soluble in water and alcohol and decomposed on treatment with alkali yielding the sulfonate salt and aniline. The aniline salt of tetrafluoroethanesulfonic acid darkened when heated on a copper block in air and melted at about 230–235° C.

|  | F | N | S | Neutral equiv. |
|---|---|---|---|---|
|  | Percent | Percent | Percent |  |
| Found | 28.58 | 5.23 | 11.66 | 274.3; 273.3 |
| Calc. for $HC_2F_4SO_3H \cdot NH_2C_6H_5$ | 27.65 | 5.09 | 11.65 | 275 |

The above salt is also obtained when tetrafluoroethanesulfonic acid-monohydrate is reacted with phenylisocyanate.

Example IV

An autoclave was flushed with nitrogen and charged with 40 parts of sodium sulfite, 150 parts of distilled water and 25 parts of vinylidene fluoride. The reaction mixture was heated at 120° C. for 8 hours and then evaporated to dryness and extracted with absolute alcohol. There was obtained 6.7 parts of alcohol-soluble salts which melted at about 274–278° C. and which contained 17.43% fluorine, 12.79% sulfur, and 14.76% sodium.

Among the polyfluoroethylenes which are applicable in this invention are trifluorochloroethylene, trifluorobromoethylene, trifluoroiodoethylene, trifluoroethylene, 1,1-difluoro-2,2-dichloroethylene, 1,1-difluoro-2-chloroethylene, and vinylidene fluoride. Tetrafluoroethylene is particularly preferred for use in this invention.

Examples of water-soluble alkali and alkaline earth sulfites and bisulfites suitable for use in this invention are those of sodium, potassium, ammonium, lithium, magnesium and calcium.

It will be understood that the operating conditions may vary widely depending upon the nature of the compounds being reacted and also upon the results desired. The time required for carrying out the reactions may vary from a few minutes to several days depending upon the nature of the reactants and the other operating conditions such as temperature and pressure.

The process may be operated continuously or intermittently. The reaction may be carried out in a closed system or the reaction may be carried out by bubbling the vapors of the polyfluoroethylene through a column containing the aqueous solution of the sulfurous acid salt. In general, the reaction is carried out under subatmospheric, atmospheric or superatmospheric pressure in the range .1 to 1000 atmospheres. The preferred pressure range is 1 to 200 atmospheres.

Although generally it is preferable to use aqueous solutions, in certain instances it may be desirable to add small amounts of organic solvents. The polyfluoroethylene employed may contain stabilizers such as tributylamine or "Terpene B" hydrocarbon which exert no deleterious effect on the present reaction.

The reactions may be carried out in any suitable reaction vessel such as stainless steel, iron, enamel, silver, aluminum, and other metals and alloys which are capable of withstanding heat and pressure. The reaction is preferably carried out with agitation, although agitation is not always necessary.

The reaction and the separation or isolation of the products may be carried out simultaneously or in separate steps. The products may be separated by evaporation and extraction with alcohol or by acidifying with a strong mineral acid and distilling or extracting, or by any other convenient method. A convenient method for separating sodium difluoroacetate from sodium tetrafluoroethanesulfonate consists in acidifying with hydrochloric acid and distilling to remove the difluoroacetic acid and excess hydrochloric acid. The tetrafluoroethanesulfonate salt can then be separated from the sodium chloride by extracting with absolute ethyl alcohol.

The present invention is useful for the production of a wide variety of organic fluorine-containing sulfonic acids and derivatives. The polyfluoroethanesulfonate salts can be converted into the corresponding sulfonic acids by acidifying with a strong mineral acid such as sulfuric, or phosphoric acid and can be separated by distilling or extracting with ether. The polyfluoroethanesulfonic acids are strong acids, very soluble in water, stable to distillation and readily form water-soluble salts with organic and inorganic bases such as ammonia, primary, secondary, and tertiary amines, methyl amine, dimethylamine, trimethylamine, aniline, α-naphthaylamine, N-monomethyl aniline, morpholine, dodecylamine, hexamethylenediamine, amino acids, hydrazines, and with hydroxides and basic salts of sodium, potassium, lithium, calcium, barium, aluminum, zinc, iron, copper, lead, and bismuth. Thus, tetrafluoroethanesulfonic acid readily forms water-soluble salts with inorganic bases to yield salts such as sodium, potassium, calcium, barium, lead, iron, bismuth, zinc, magnesium, and nickel salts. Also tetrafluoroethanesulfonic acid readily forms water-soluble ammonium or substituted ammonium salts with ammonia, primary, secondary and tertiary organic amines.

The products of this invention are useful for various commercial purposes. The sulfonic acids of this invention are strong stable acids which are soluble in various organic solvents and can be used advantageously in place of sulfuric acid, for example, as catalysts in various reactions in which sulfuric acid causes excessive charring. Many of the products have been found to be very desirable in that they are substantially nonflammable.

The polyfluoroethanesulfonic acids and salts prepared in accordance with this invention have outstanding thermal and chemical stability.

The invention is particularly advantageous in that it offers a safe, flexible, practical and economical method of producing highly fluorinated products of the character herein described. One of the advantages of the invention is that the process may be operated without catalyst and the reaction proceeds smoothly and easily.

As many apparently widely different embodiments of this invention may be made without departing from the spirit and scope thereof, it is to be understood that I do not limit myself to the specific embodiments thereof except as defined in the appended claims.

I claim:

1. A process for the production of salts of polyfluoro organic acids which comprises reacting a polyfluoroethylene containing at least two fluorine atoms, two of which are attached to one carbon atom, with an inorganic sulfurous acid salt.

2. A process for the production of salts of polyfluoro organic acids which comprises reacting a polyfluoroethylene containing at least two fluorine atoms, two of which are attached to one carbon atom, with a water-soluble inorganic sulfurous acid salt.

3. A process for the production of salts of polyfluoro organic acids which comprises reacting a polyfluoroethylene containing at least three halogen atoms of which at least two are fluorine and are attached to one carbon atom with a water-soluble inorganic sulfurous acid salt.

4. A process for the production of salts of polyfluoro organic acids which comprises reacting a polyfluoroethylene containing at least three halogen atoms of which at least two are fluorine and are attached to one carbon atom with an aqueous solution of a water-soluble inorganic sulfurous acid salt.

5. A process for the production of salts of polyfluoro organic acids which comprises reacting a polyfluoroethylene containing at least three fluorine atoms with an aqueous solution of a water-soluble inorganic sulfurous acid salt.

6. A process for the production of salts of polyfluoro organic acids which comprises reacting at an elevated temperature under pressure a polyfluoroethylene containing at least three fluorine atoms with an aqueous solution of a water-soluble inorganic sulfurous acid salt.

7. A process for the production of salts of polyfluoro organic acids which comprises reacting a polyfluoroethylene containing at least three fluorine atoms with an aqueous solution of a water-soluble inorganic sulfurous acid salt selected from the class consisting of alkali metal sulfites and bisulfites.

8. A process for the production of salts of polyfluoro organic acids which comprises reacting tetrafluoroethylene with an aqueous solution of a water-soluble inorganic sulfurous acid salt.

9. A process for the production of tetrafluoroethanesulfonates and difluoroacetates which comprises reacting tetrafluoroethylene with an aqueous solution of a member selected from the class consisting of sodium and potassium sulfites and bisulfites.

10. The chemical compound 1,1,2,2-tetrafluoroethanesulfonic acid.

11. A polyfluoro organic compound of the general formula

where two X's attached to one carbon atom are fluorine, the other two X's are selected from the group consisting of hydrogen and halogen, and Z is a monovalent radical containing a sulfonyl group of which the sulfur atom is directly connected to carbon of the $(CX_2CX_2)$ group.

12. A polyfluoroethanesulfonyl compound of the general formula

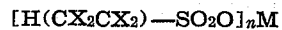

where two X's attached to one carbon atom are fluorine, the other two X's are selected from the group consisting of hydrogen and halogen, M is a member selected from the groups consisting of hydrogen, metals and inorganic radicals which will yield a water-soluble inorganic sulfurous acid salt, and n is a positive integer equal to the valence of M.

13. A tetrafluoroethanesulfonyl compound of the general formula

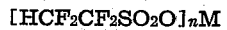

where M is a member selected from the group consisting of hydrogen, metals and inorganic radicals which will yield a water-soluble inorganic sulfurous acid salt, and n is a positive integer equal to the valence of M.

14. A tetrafluoroethanesulfonyl compound of the general formula $$H(CF_2CF_2)Z$$

where Z is a monovalent radical containing a sulfonyl group of which the sulfur atom is directly connected to carbon of the $(CF_2CF_2)$ group.

15. A process for the production of difluoroacetic acid salts which comprises reacting tetrafluoroethylene with a water-soluble inorganic sulfurous acid salt in aqueous solution having a pH above 8.

16. A polyfluoroethylsulfonyl compound containing at least two fluorine atoms attached to one of the carbons of the ethyl group.

17. The sodium salt of 1,1,2,2-tetrafluoroethanesulfonic acid.

PAUL L. BARRICK.